United States Patent [19]
Sakai et al.

[11] Patent Number: 5,453,853
[45] Date of Patent: Sep. 26, 1995

[54] COLOR VIDEO STILL IMAGE PROCESSING SYSTEM

[75] Inventors: Yorihiko Sakai, Tokyo; Kohei Sakura, Kanagawa, both of Japan

[73] Assignee: Sony Corporation, Tokyo, Japan

[21] Appl. No.: 854,388

[22] Filed: Mar. 19, 1992

[30] Foreign Application Priority Data

Mar. 25, 1991 [JP] Japan ........................... 3-060414

[51] Int. Cl.⁶ ........................................... H04N 1/46
[52] U.S. Cl. .................... 358/518; 358/504; 358/506; 358/512
[58] Field of Search ................. 358/75, 80, 487, 358/214, 76, 453, 504, 505, 506, 515, 534, 518; 382/9; 348/175, 187, 188

[56] References Cited

U.S. PATENT DOCUMENTS

| 2,757,571 | 8/1956 | Loughren | 358/506 |
|---|---|---|---|
| 3,123,666 | 3/1964 | Bailey | 358/534 |
| 4,167,022 | 9/1979 | Dischert et al. | 348/188 |
| 4,679,074 | 7/1987 | Sugiura et al. | |
| 4,751,569 | 6/1988 | Clinton et al. | 358/501 |
| 4,845,551 | 7/1989 | Matsumoto | 358/506 |
| 4,860,059 | 8/1989 | Terashita | 355/38 |
| 4,888,636 | 12/1989 | Abe | 358/80 |
| 4,930,009 | 5/1990 | Shiota | 358/506 |
| 4,939,581 | 7/1990 | Shalit | 358/244 |
| 4,956,703 | 9/1990 | Uzuda | 358/504 |
| 4,959,790 | 9/1990 | Morgan . | |
| 4,970,584 | 11/1990 | Sato et al. | 358/75 |
| 5,040,070 | 8/1991 | Higashitsutsumi et al. . | |
| 5,053,866 | 10/1991 | Johnson | 358/504 |
| 5,180,305 | 1/1993 | Farrah | 434/102 |
| 5,208,664 | 5/1993 | Yamada et al. | 358/518 |
| 5,267,030 | 11/1993 | Giorgianni et al. | 358/518 |
| 5,339,176 | 8/1994 | Smilansky et al. | 358/518 |

FOREIGN PATENT DOCUMENTS

| 0259981 | 3/1988 | European Pat. Off. . |
|---|---|---|
| 0296682 | 12/1988 | European Pat. Off. . |
| 0323849 | 7/1989 | European Pat. Off. . |
| 0354490 | 2/1990 | European Pat. Off. . |
| 0398502 | 11/1990 | European Pat. Off. . |
| 0505984 | 9/1992 | European Pat. Off. . |
| 2160060 | 12/1985 | United Kingdom . |

Primary Examiner—Edward L. Coles, Sr.
Assistant Examiner—Madeleine Nguyen
Attorney, Agent, or Firm—William S. Frommer; Alvin Sinderbrand

[57] ABSTRACT

The present invention is directed to a method of processing a color video signal in which printing color separation data is formed from a color video signal and a printing original plate is made by using the printing color separation data. This color video signal processing method is comprised of the steps of reading out a reference color test chart by a printing scanner and producing scanner four color separation data of the reference color test chart by the printing scanner, taking a picture of the reference color test chart radiated by a standard light source by a video camera, producing camera four color separation data from a color video signal output from the video camera, comparing the scanner four color separation data with the camera four color separation data and allowing a level difference therebetween to be stored in a memory as correcting data which is used to correct the camera four color separation data, and correcting the four color separation data by the correcting data stored in the memory to thereby produce four color separation data when the four color separation data for making the printing original plate are generated from a color video signal of the video camera. Therefore, a printing original plate having satisfactory color reproducibility can be produced by utilizing the video camera.

7 Claims, 2 Drawing Sheets

COLOR VIDEO STILL IMAGE PROCESSING SYSTEM

BACKGROUND OF THE INVENTION

1. Field of the Invention

The present invention relates generally to video signal processors for a printer and, more particularly is directed to a color video still image processing system in which printing color separation data is formed from a color video still image.

2. Description of the Related Art

As is conventional, a color printing original plate is made by using a predetermined one field or one frame of a video signal (i.e., still image signal) generated from a video camera or an electronic still camera. In this case, the video signal from the video camera or from the electronic still camera is converted into digital data of three primary colors R (red), G (green) and B (blue). The digital data R, G and B are converted into reflection density (i.e.,—log conversion), thereby being produced as color separation data of four colors of three primary colors (cyan C, magenta M, yellow Y) of subtractive process and black K. Data of black K is determined by the minimum values of cyan C, magenta M and yellow Y.

Then, original plates of four colors of cyan C, magenta M, yellow Y and black K are made by using respective color data of color separation data of four colors and one color still image is printed by using the original plates of four colors. The color still image is printed by using the color separation data of four colors in exactly the same way such that a color image taken by a halide film is printed.

The color image printed via the original plates made by the video signal is unsatisfactory as compared with the color image printed via the original plate made by the halide film. That is, the video still image has poor hue and color saturation as compared with those of the color still image of the halide film so that the video still image has poor color reproducibility. As a consequence, the color video still image becomes unsatisfactory as compared of the color still image of the halide film. To be more concrete, the color saturation of the color video still image is about 60% of that of the halide film still image so that the color image is hardly printed by using the original plate made by the video signal in the prior art. If the user insists that the color video still image is printed by using the original plate made from the video signal, those who are engaged in making the original plate must adjust hue and color saturation with reference to four color separation data. That is, this color adjustment is a manual labor dependent on the visual sense of those skilled in the art.

OBJECTS AND SUMMARY OF THE INVENTION

Therefore, it is an object of the present invention to provide an improved color video still image processing system in which the aforesaid shortcomings and disadvantages of the prior art can be eliminated.

More specifically, it is an object of the present invention to provide a color video still image processing system in which a color image obtained from a video signal of a video camera can demonstrate color reproduction similar to that of a color image printed by using a printing scanner.

Another object of the present invention is to provide a color video still image processing system by which video apparatus such as an electronic still camera or the like can be utilized to produce a printing original plate.

A further object of the present invention is to provide a color video still image processing system by which a printing original plate can be manufactured with ease.

As a first aspect of the present invention, a method of processing a color video signal in which printing color separation data is formed from a color video signal and a printing original plate is made by using the printing color separation data is comprised of the steps of reading out a reference color test chart by a printing scanner and producing scanner four color separation data of the reference color test chart by the printing scanner, taking a picture of the reference color test chart radiated by a standard light source by a video camera, producing camera four color separation data from a color video signal output from the video camera, comparing the scanner four color separation data with the camera four color separation data and allowing a level difference therebetween to be stored in a memory as correcting data which is used to correct the camera four color separation data, and correcting the four color separation data by the correcting data stored in the memory to thereby produce four color separation data when the four color separation data for making the printing original plate are generated from a color video signal of the video camera. Therefore, a printing original plate having satisfactory color reproduction property can be produced by utilizing the video camera.

In accordance with a second aspect of the present invention, a system for processing a color video signal in which printing color separation data is formed from a color video signal and a printing original plate is made by using the printing color separation data is comprised of a printing scanner for reading out a reference color test chart and outputting four color separation data which are used to make a printing original plate, a video camera for taking a picture of the reference color test chart radiated by a standard light source to thereby output a color video signal, a four color separation data generating circuit for generating four color separation data from the color video signal output from the video camera, a comparing circuit for comparing the four color separation data from the printing scanner with the four color separation data generated from the color video signal, and a correcting data generating circuit for generating correcting data on the basis of a difference information obtained from the comparing circuit, wherein the color video signal from the color video camera is corrected by using the correcting data to thereby produce four-color color separation data when the four color separation data for making the printing original plate are generated from a color video signal of the video camera.

BRIEF DESCRIPTION OF THE DRAWINGS

A better understanding of other objects, features, and advantages of the invention can be gained from a consideration of the following detailed description of an illustrative embodiment thereof, in conjunction with the figures of the accompanying drawings, wherein.

DETAILED DESCRIPTION OF THE PREFERRED EMBODIMENT

An embodiment of the present invention will now be described with reference to the drawings.

Figure 1:
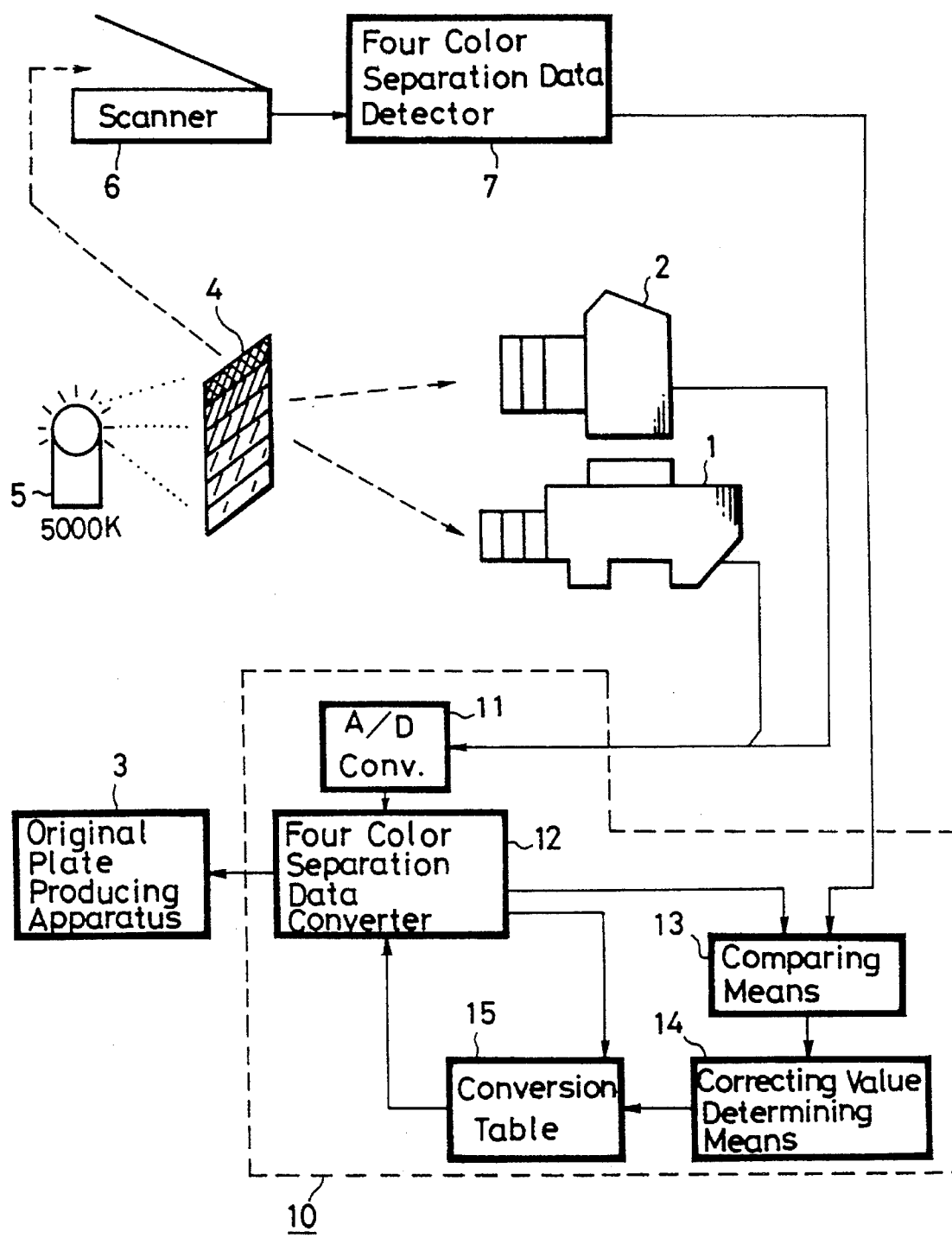
FIG. 1 shows in block form an entire arrangement of a color video still image processing system according to the present invention.

FIG. 1 of the accompanying drawings shows the entire arrangement of the color video still image processing system according to an embodiment of the present invention. In FIG. 1, reference numeral 1 depicts a video camera and 2 an electronic still camera. The video camera 1 can continuously take a picture of an object, record a video signal thereof on a video tape and reproduce a recorded video signal from the video tape continuously. The electronic still camera 2 can record one field of or one frame of a video signal (still image signal) of an object taken at a predetermined timing on a magnetic disk and reproduce a recorded video signal from the magnetic disk. The video signal recorded and reproduced in that case is an analog composite video signal according to the broadcast standards such as the NTSC system or the like. When a printing original plate is made by using one predetermined field or frame of the video signal taken and recorded on the video tape by the video camera 1, that one field or frame is reproduced from the video tape and then supplied to an image data converting apparatus 10. Also, when a printing original plate is made by using one predetermined field or frame of the video signal taken and recorded on the magnetic disk by the electronic still camera 2, that one field or frame is reproduced from the magnetic disk and then supplied to the image data converting apparatus 10. The video camera 1 and the electronic still camera 2 will hereinafter be generally referred to as a video camera for simplicity.

In the image data converting apparatus 10, one field or one frame of the analog composite video signal from the video camera is supplied to an analog-to-digital (A/D) converter 11, in which it is converted into digital video signals of three primary colors (R, G, B). The digital video signals of three primary colors R, G and B are supplied to and converted into a reflection density by a four color separation data converter 12 and are thereby produced as data (four color separation data) of four colors of three primary colors (cyan C, magenta M and yellow Y) according to the subtractive process and black K. In this embodiment, when the digital video signals of three primary colors R, G and B are converted into the four color separation data C, M, Y and K, the four color separation data C, M, Y and K are corrected on the basis of correcting data stored in a conversion table 15 which will be described later.

Then, the four color separation data C, M, Y and K thus produced by the four color separation data converter 12 are supplied to an original plate producing apparatus 3 as an output of the image data converting apparatus 10 and the original plate producing apparatus 3 produces original plates of four colors (four original plates) of cyan C, magenta M, yellow Y and black K by utilizing respective color data supplied thereto. The four color original plates thus made are utilized to print a color still image by a predetermined printing apparatus.

An arrangement in which the four color separation data are corrected by utilizing the conversion table 15 in the image data converting apparatus 10 will be described below.

The correcting data stored in the conversion table 15 are obtained by utilizing a transparent-type color test chart 4. More specifically, the color test chart 4 on which a plurality of colors having various gray levels are provided is illuminated by the radiation of a standard lighting apparatus 5 at color temperature of 5000° K. and a picture of the transparent type color test chart 4 thus radiated is taken by the video camera (video camera 1 or electronic still camera 2) utilized when the original plate is made. Then, one field or one frame of video signal, which results from shooting the color test chart 4 by the video camera, is supplied to the image data converting apparatus 10, in which it is converted into the digital video signals of three primary color signals R, G and B by the A/D converter 11 and then converted into the four color separation data C, M, Y and K by the four color separation data converter 12. When the digital video signals of three primary colors R, G and B are converted into the four color separation data, at this time the four color separation data are not corrected by the correcting data stored in the conversion table 15.

Then, the four color separation data C, M, Y and K based on the still image of the color test chart 4 are supplied to a comparing means 13.

The same color test chart 4 is, on the other hand, read by a printing scanner 6 that is utilized to make the ordinary printing original plate. Still image data on the color test chart 4 read by the printing scanner 6 is supplied to a four color separation data detector 7, in which it is converted into electrical four color separation data C, M, Y and K. The four color separation data C, M, Y and K from the detector 7 are supplied to the comparing means 13 in the image data converting apparatus 10.

The comparing means 13 compares the four color separation data C, M, Y, K obtained by the video camera with the four color separation data C, M, Y, K obtained by the read-out by the printing scanner 6 to thereby detect gray level difference of respective colors at respective points (respective pixels). The gray level difference data thus detected by the comparing means 13 is supplied to a correcting value determining means 14, and the gray level difference data is stored (memorized) in the conversion table 15 as the correcting value under the control of the correcting value determining means 14.

The conversion table 15 includes a memory (not shown) which stores the correcting value supplied from the correcting value determining means 14. The conversion table 15 is supplied with the four color separation data C, M, Y and K converted by the four color separation data converter 12 and reads out and supplies the converter 12 with correcting values corresponding to the four-color separation data C, M, Y and K supplied from the converter 12. At that time, if proper correcting values corresponding to the four color separation data C, M, Y, K supplied from the converter 12 are not stored in the conversion table 15, then data of other gray level than those stored therein are interpolated within the conversion table 15 to generate correcting values, which are then fed to the converter 12. Since the gray level of black K is determined by the minimum values of data of other colors as described above, a correcting value of the black K need not be stored in the conversion table 15.

Figure 2:
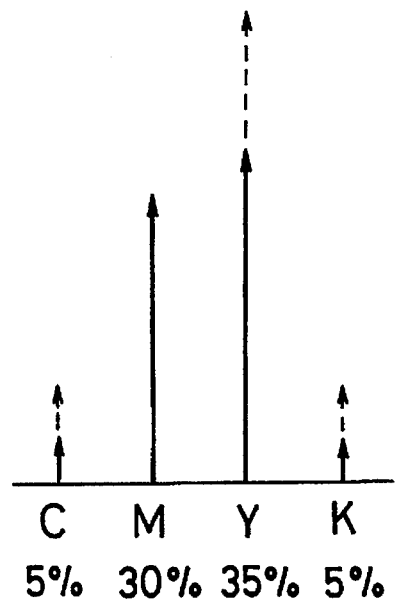
FIG. 2 is a representation used to explain the present invention and illustrating an example of color separation data read-out by a video camera according to the embodiment of the present invention.
Figure 3:
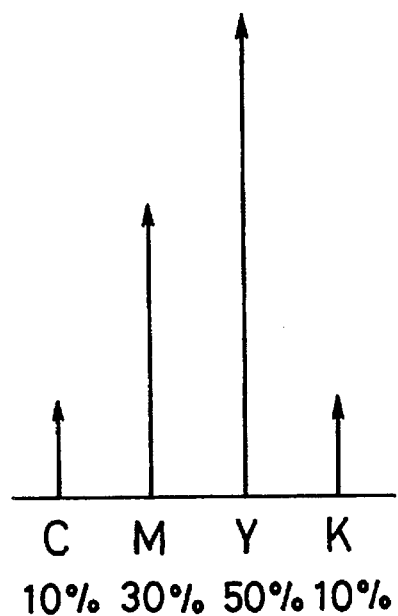
FIG. 3 is a representation used to explain the present invention and illustrating an example of color separation data read-out by a scanner according to the embodiment of the present invention.

Since the image data converting apparatus 10 is constructed as described above, the color printing original plates of four colors of cyan C, magenta M, yellow Y and black K are satisfactorily made from the video signal of the video camera by the original plate producing apparatus 3. More specifically, let it be assumed that, when the video signal from the video camera, for example, is converted into the four color separation data C, M, Y and K by the four color separation converter 12 within the image data converting apparatus 10, gray levels of the four-color color separation data C, M, Y and K at a certain portion before being corrected are 5% for cyan C, 30% for magenta M, 35% for yellow Y and 5% for black K, respectively, as shown in FIG. 2. At that time, if correcting values corresponding to the four color separation data C, M, Y and K of the above-mentioned respective gray levels are read out from the conversion table 15 and these correcting values are adapted to increase gray levels of cyan C, yellow Y and black K by 5%, 15% and 5%, respectively, then the respective gray levels are increased by the correction in the four color separation data converter 12 as shown by broken lines in FIG. 2. Then, four color separation data thus corrected are supplied to the original plate producing apparatus 3. The correcting values stored in the conversion table 15 are provided on the basis of the four-color color separation data similar to those read out from the color test chart 4 by the scanner 6 so that, when the four color separation data C, M, Y and K of the video signal supplied from the video camera are set in the conditions shown in FIG. 2, then gray levels added with the correcting values as shown in FIG. 3 become similar four color separation data read out by the printing scanner 6. Accordingly, by correcting the gray levels to those illustrated in FIG. 3, the four color separation data from the video camera are allowed to have gray levels similar to those of the four color separation data read out from the color test chart 4 by the printing scanner 6. Therefore, a color image original plate whose quality (color reproducibility) is the same as that of color image provided when the color separation data are read out by the printing scanner 6, which can compensate for a low color saturation of a video signal utilized in the ordinary video camera. In this case, since this correcting work is carried out automatically, those who are engaged in making the original plate need not adjust the colors in a manual fashion while checking colored conditions of respective colors. Thus, a printing original plate for satisfactory colors can be produced with ease and a uniform color adjustment can be carried out constantly unlike the manual color adjustment.

Incidentally, since the read-out work for reading out color separation data from the color test chart 4 by the printing scanner 6 is carried out once in the first stage, the printing scanner 6 and the four color separation data detector 7 are required only in the initialization. Therefore, in the succeeding stages during which the original plate is made, it is sufficient that the image data converting apparatus 10 is provided between the video signal source such as the video camera or the like and the original plate producing apparatus 3. Thus, the original plate can be made readily with ease.

According to the present invention, since the color image printed by means of the original plate made by utilizing the video camera can be printed with a color reproducibility similar to that of the color image printed by means of the original plate made in the ordinary printing process utilizing the printing scanner or the like, instead of the halide film camera, the video apparatus such as the electronic still camera or the like can be utilized to produce the printing original plate and therefore the printing original plate can be produced with ease.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A method of processing a color video signal in which printing color separation data is formed from a color video signal for producing a printing original plate therefrom, comprising the steps of:

scanning a reference color test chart by a printing scanner so as to produce scanner four color separation data of said reference color test chart from said printing scanner;

imaging said reference color test chart radiated by a standard light source, by a video camera, so as to generate a color video signal representing said reference color test chart;

producing camera four color separation data from said color video signal representing said reference color test chart;

comparing color data of said scanner four color separation data with corresponding color data of said camera four color separation data to produce respective level differences therebetween and storing said level differences in a memory as correcting data; and correcting subsequently produced camera four color separation data by selectively adjusting each of said subsequently produced camera four color separation data in accordance with the respective correcting data stored in the memory so as to thereby provide corrected four color separation data for producing a printing original plate from a color video signal of said video camera.

2. The method according to claim 1, wherein said color test chart is a transparent type color test chart.

3. The method according to claim 1, wherein the color video signal generated by said video camera is comprised of three primary colors and said four color separation data are obtained from said three primary colors.

4. A system of processing a color video signal in which printing color separation data is formed from a color video signal for producing a printing original plate therefrom, comprising:

a printing scanner for scanning a reference color test chart so as to provide scanner four color separation data;

a video camera for imaging said reference color test chart, radiated by a standard light source, so as to generate a color video signal representing said reference color test chart;

four color separation data generating means for generating camera four color separation data from said color video signal representing said reference color test chart;

comparing means for comparing respective color data of said scanner four color separation data with corresponding color data of said camera four color separation data to produce respective difference data;

storing means for storing said difference data;

correcting data generating means for generating correcting data on the basis of said respective difference data produced by said comparing means; and means for correcting subsequently produced camera four color separation data by selectively adjusting each of said subsequently produced camera four color separation data in accordance with the respective correcting data stored in said storage means so as to thereby provide corrected four color separation data for producing said printing original plate.

5. The system according to claim 4, wherein said color test chart is a transparent type color test chart.

6. The system according to claim 4, wherein the color video signal outputted by said video camera is comprised of three primary colors and said four color separation data are obtained from said three primary colors.

7. The system according to claim 4, wherein said correcting data generating means includes a memory for storing a conversion table.

* * * * *